July 25, 1933.  C. PETTINGILL  1,919,858
METHOD OF DETERMINING AND RECORDING OXYGEN CONTENT OF LIQUID OR GASES
Filed July 21, 1931
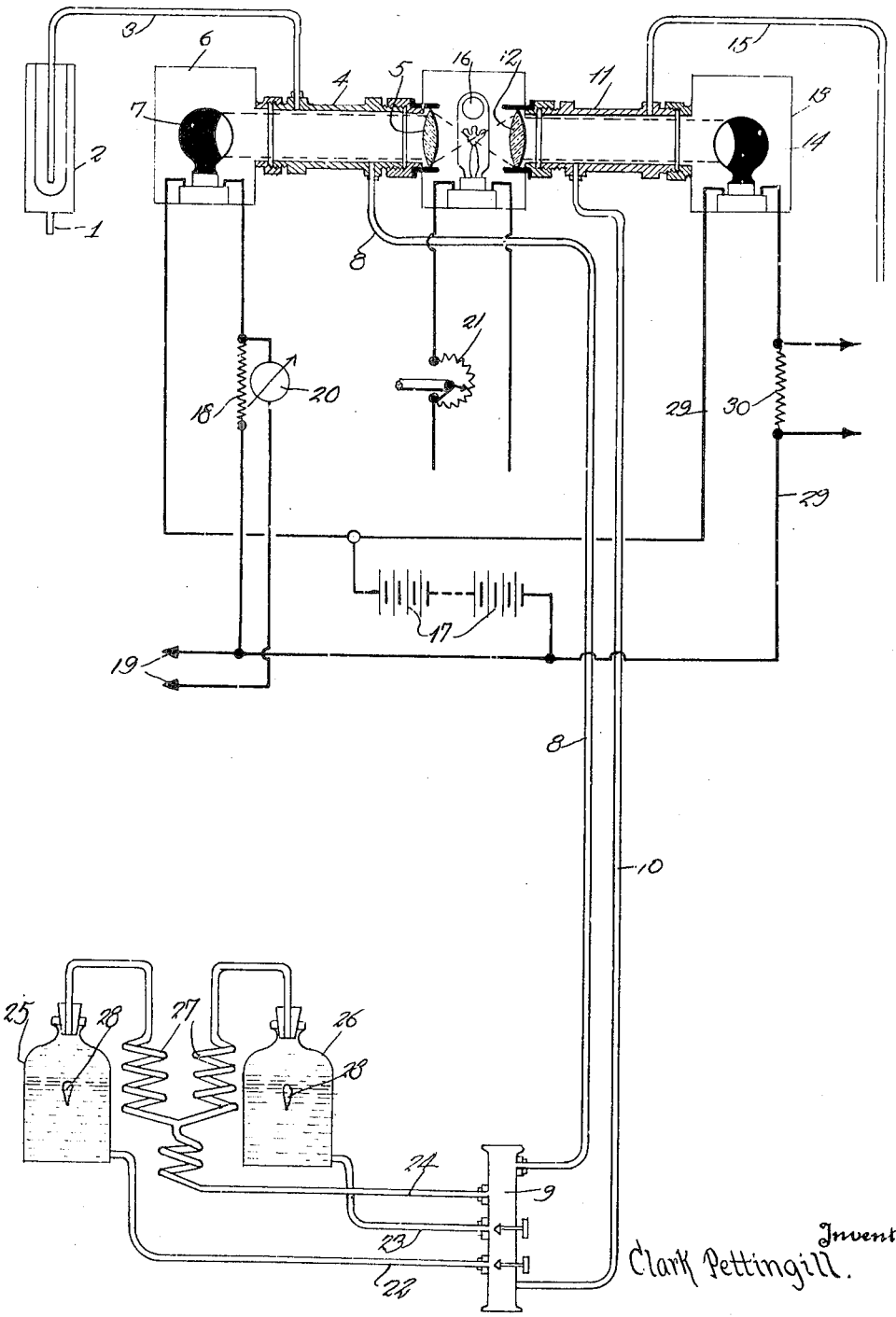
Inventor
Clark Pettingill.
By
H. L. Bryant
Attorney

Patented July 25, 1933

1,919,858

UNITED STATES PATENT OFFICE

CLARK PETTINGILL, OF SEAL BEACH, CALIFORNIA

METHOD OF DETERMINING AND RECORDING OXYGEN CONTENT OF LIQUID OR GASES

Application filed July 21, 1931. Serial No. 552,284.

This invention relates to the method of determining and recording oxygen content of liquid or gases and the method includes adding to the water to be analyzed for oxygen, pyrogallol and an alkali, or any other reagents which react with oxygen to cause a color change, a turbidity, or other change in radiation absorption, which varies with the quantity of dissolved oxygen; and upon measuring the above named changes in radiation absorption, and interpreting this measure in terms of units of dissolved oxygen, per unit of water.

By passing radiant energy of constant or known intensity, such as light, either visible, ultra violet or infra red, or any combination of them through the solution, the color change, the turbidity change, or other change in radiation absorption may be measured by suitable instruments, such as a photo-electric cell, a thermo-pile, a colorimeter, a thermometer, a radiometer or other radiation sensitive apparatus or light sensitive photographic or other light sensitive material. As the above named changes in radiation absorption of the water, containing dissolved oxygen and the above named reagents, vary with the quantity of dissolved oxygen, the measure of the changes is a measure of the quantity of dissolved oxygen. If pyrogallol and an alkali are added to water containing dissolved oxygen, a colored compound will be formed. The more oxygen there is dissolved in the water the more of the compound there will be formed, and the darker will be the color, provided the pyrogallol and alkali are always in excess.

The above method may be modified to analyze for oxygen gas mixed with other gases by absorbing the oxygen content of the mixture in water containing reagents such as mentioned above.

Now if a light of known constant intensity is allowed to pass through a definite thickness of this colored solution and then enter a suitable photo-electric cell, which is connected in series with a constant source of electric potential and a constant resistance, the drop in potential across the terminals of the resistance will vary with the current which is forced through the photo-electric cell and the resistance by the source of potential, and the above named current will vary with the amount of light entering the photo-electric cell, and the amount of light entering the photo-electric cell will vary with the density of the color of the solution, and the drop in potential across the resistance can be measured and the measure can be interpreted in terms of units of oxygen dissolved in a unit quantity of water.

The apparatus may be calibrated by adding known and varying amounts of oxygen to different samples of pure water, containing pyrogallol and alkali, and measuring the density of the color as described above.

The potential drop across the above resistance can be measured by the use of an instrument known as a potentiometer, which may be either an indicating or recording instrument, and can be calibrated to read directly in units of oxygen. These instruments may be obtained with suitable galvanometer resistance and suitable graduations.

Recording mechanism for the dissolved oxygen is provided and a diagrammatic illustration thereof is shown in the accompanying drawing.

Referring more in detail to the accompanying drawing, the apparatus comprises a water inlet 1, in communication with a source of supply, the inlet 1 leading to a filter 2 that has a pipe connection 3 with a liquid cell 4. The liquid cell 4 is in the form of a horizontally disposed tube that has a convex lens 5 set in one end thereof and a flat lens in the other end which is in optical communication with the casing 6 in which a photo-electric cell 7 is located. The pipe 3 empties into the upper side of the tube 4 adjacent the casing 6 while a water outlet pipe 8 is connected to the lower side of the tube 4 adjacent the lens 5.

The pipe 8 leads to a manifold 9 where the reagents are introduced and a pipe 10 forms communication between the manifold 9 and a second horizontally disposed tube 11 that is aligned with and spaced from the tube 4. The end of the tube 11 adjacent the tube 4 carries a convex lens 12 and a flat lens in the other outer end which is in optical communication with a casing 13 having a photo-electric cell 14 disposed therein. The pipe 10 enters the lower side of the tube 11 adjacent the lens carrying end while an outlet pipe 15 leading to a waste or drain, is in communication with the upper side of the tube 11 adjacent the casing 13.

A lamp 16 is interposed between the spaced ends of the casings 4 and 11 and light therefrom is focused in parallel rays through the liquid tube 4 and into the photo-electric cell 7. Current from battery 17 passes through photo-electric cell 7, in proportion to the amount of light entering photo-electric cell 7, and this current in turn passes through resistance 18, causing a potential difference across the terminals of resistance 18, in proportion to the current passing through resistance 18, and in proportion to the light entering photo-electric cell 7. The potential across resistance 18 is compared to a source of constant potential 19, through a galvanometer 20 which is connected in series with resistance 18 and said source of constant potential.

When the potential drop across the terminals of resistance 18 is equal to the source of constant potential, no current will pass through the galvanometer. This condition will prevail if the light 16 is of a certain definite brightness and the water in liquid tube 4 has a certain definite value of light transmission. If the light value should increase from this value, the potential across 18 would increase and cause a current to pass through the galvanometer 20 in a certain direction and cause it to deflect in a certain direction. If the light value should decrease, the galvanometer 20 would be deflected in the opposite direction. Similarly, if the light transmission of the water in liquid tube 4 should increase (due to decrease of turbidity or other cause) the galvanometer 20 would be deflected in the same direction as if the light value of lamp 16 should increase, and if the light transmission of the water should decrease, the galvanometer 20 would be deflected in the opposite direction. Now if the galvanometer is made to control a rheostat, which is in series with the lamp 16, so that if the light of lamp 16 or the light transmission of the water in liquid cell 1 increases, the resistance of the rheostat 21 will be increased, and if the light of lamp 16 or the light transmission of the water in liquid tube 4 decreases, the resistance of the rheostat 21 will be decreased; the lamp 16 will be regulated so as to compensate for voltage changes of its current source and also to compensate for changes in light absorption in the water, due to causes other than dissolved oxygen. That is by the foregoing arrangement the value of the light entering photo-electric cell 14, the measuring cell, is kept at a constant value regardless of turbidity changes in the water or voltage fluctuations in the supply to lamp, except for the desired changes due to the presence of oxygen and reagents in liquid tube 11.

Connected to the mixing manifold through tubes, are two reagent bottles 25 and 26, the bottle 25 containing a solution of pyrogallol which has its specific gravity increased to about 1200 by adding sugar, (the sugar is chemically inert in this application) and other bottle 26 containing a solution of sodium carbonate of about 1200 specific gravity. Due to the high specific gravity of these solutions, and due to the bottles being higher than the mixing manifold and due to the tube 24, which allows the solutions to be displaced by water from the manifold, the solutions will flow into the mixing manifold. The flow is restricted to the proper amount by the small bore coiled copper tubing 27. Small glass floats 28 of about 1100 specific gravity are placed in the bottles and float at the dividing line between the heavy reagents and the water above.

After being mixed with the reagents, the water will be colored brown if it contains oxygen and the density of the color will be greater when the quantity of oxygen is greater. This varying color will cause a varying absorption of the light which passes from the lamp 16 through liquid tube 11 and into the photo-electric cell 14. Liquid tube 11 and the photo-electric cell 14 are arranged in the same relation to lamp 16 as liquid tube 4 and photo-electric cell 7 and liquid tube 11 is a duplicate of liquid tube 4. Photo-electric cell 14 is connected as at 29 in series with battery 17 and resistance 30. The greater the quantity of oxygen in the water, the greater will be the light absorption in liquid tube 11, and the lesser will be the light entering photo-electric cell 14. The lesser light entering photo-electric cell 14 will cause a lesser current to flow through itself and resistance 30, and so cause a lesser drop in potential across the terminals of resistance 30. Likewise, the lesser the quantity of oxygen in the water, the lesser will be the light absorption, the greater will be the light entering photo-electric cell 14, the greater will be the current through resistance 30 and the greater will be the potential drop across the terminals of resistance 30.

The potential drop across resistance 30 is measured and recorded on a recording potentiometer in circuit with the opposite ends of the resistance 30. The record is in millivolts, but by means of calibration tables may be interpreted in grains of oxygen per gallon of water or cubic centimeters of oxygen per liter of water. The instrument could be calibrated to read directly in units of oxygen per unit of water.

While the preferred method and apparatus have been herein described and illustrated for determining and recording oxygen content of liquids or gases, it is to be understood that other methods and devices may be employed, such as will fall within the scope of the subject matter claimed.

I claim:—

1. A non-titration process of quantitatively analyzing water for dissolved oxygen consisting of adding alkaline pyrogallol or related substances to the water to form colored or turbid substances, and then directly measuring the color or radiation absorption.

2. The method of determining the oxygen content of a flowing stream of water which consists in passing a radiation from a variable source through the stream at one point in its flow, utilizing the light after its passage to effect control of the radiation source and maintain it at constant intensity, adding reagents to the water after its movement past the light source adapted to cause definite resistance to the passage of radiations from said source in accordance with the oxygen content of the water, again passing radiations from said light source through a point in the flow of the stream after the introduction of the reagents, and causing the last mentioned radiations to affect a radiation intensity measuring device.

3. The method of determining the oxygen content of a flowing stream of water which consists in passing a radiation from a variable source through the stream at one point in its flow, utilizing the light after its passage to effect control of the radiation source and maintain it at constant intensity, adding reagents to the water after its movement past the light source adapted to cause definite resistance to the passage of radiations from said source in accordance with the oxygen content of the water, again passing radiations from said light source through a point in the flow of the stream after the introduction of the reagents, causing the last mentioned radiations to affect a radiation intensity measuring device, and continuously recording action of said radiation intensity determining device.

CLARK PETTINGILL.